(12) United States Patent
Altman et al.

(10) Patent No.: US 9,268,712 B2
(45) Date of Patent: Feb. 23, 2016

(54) METHOD, SYSTEM AND APPARATUS FOR REGION ACCESS CONTROL

(75) Inventors: Asher M. Altman, Bedford, MA (US); Mark A. Schmisseur, Phoenix, AZ (US); Robert C. Swanson, Olympia, WA (US); Thomas M. Slaight, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 303 days.

(21) Appl. No.: 13/997,504

(22) PCT Filed: Sep. 30, 2011

(86) PCT No.: PCT/US2011/054409
§ 371 (c)(1),
(2), (4) Date: Jun. 24, 2013

(87) PCT Pub. No.: WO2013/048487
PCT Pub. Date: Apr. 4, 2013

(65) Prior Publication Data
US 2013/0305006 A1    Nov. 14, 2013

(51) Int. Cl.
*G06F 12/00* (2006.01)
*G06F 12/14* (2006.01)
*G06F 3/06* (2006.01)
(Continued)

(52) U.S. Cl.
CPC .............. *G06F 12/14* (2013.01); *G06F 3/0622* (2013.01); *G06F 3/0667* (2013.01); *G06F 3/0679* (2013.01); *G06F 21/6281* (2013.01); *G06F 9/545* (2013.01)

(58) Field of Classification Search
CPC ...... G06F 12/14; G06F 3/0622; G06F 3/0667
See application file for complete search history.

(56) References Cited

U.S. PATENT DOCUMENTS

| 2004/0165609 A1 | 8/2004 | Herbst et al. |
| 2006/0126615 A1* | 6/2006 | Angtin et al. ............... 370/389 |
| 2009/0106771 A1 | 4/2009 | Benner et al. |

(Continued)

FOREIGN PATENT DOCUMENTS

| CN | 1808434 | 7/2006 |
| CN | 101040282 | 9/2007 |

(Continued)

OTHER PUBLICATIONS

"PCT, International Search Report of the International Searching Authority for Application No. PCT/US2011/054409", (Jun. 1, 2012), Whole Document.

(Continued)

*Primary Examiner* — Aracelis Ruiz
(74) *Attorney, Agent, or Firm* — Blakely, Sokoloff, Taylor & Zafman LLP

(57) ABSTRACT

Techniques and mechanisms for providing access to a storage device of a computer platform. In an embodiment, an agent executing on the platform may be registered for access to the storage device, the agent being allocated a memory space by a host operating system of the platform. Registration of the agent may result in a location in the allocated memory space being mapped to a location in the storage device. In another embodiment, the agent may write to the location in the allocated memory space to request access to the storage device, wherein the request is independent of any system call to the host OS which describes the requested access.

24 Claims, 7 Drawing Sheets

(51) Int. Cl.
*G06F 21/62* (2013.01)
*G06F 9/54* (2006.01)

(56) References Cited

U.S. PATENT DOCUMENTS

2009/0113110 A1 4/2009 Chen et al.
2009/0327617 A1 12/2009 Furuichi et al.
2011/0138147 A1 6/2011 Knowles et al.

FOREIGN PATENT DOCUMENTS

CN 101556557 10/2009
JP 2003263366 9/2003

OTHER PUBLICATIONS

"PCT, International Preliminary Report on Patentability (Chapter I of the Patent Cooperation Treaty) for International Application No. PCT/US2011/054409", (Apr. 10, 2014), Whole Document.

* cited by examiner

METHOD, SYSTEM AND APPARATUS FOR REGION ACCESS CONTROL

CLAIM OF PRIORITY

This application is a U.S. National Phase application under 35 U.S.C. §371 of International Application No. PCT/US2011/054409, filed Sep. 30, 2011, entitled "METHOD, SYSTEM AND APPARATUS FOR REGION ACCESS CONTROL," the entire contents of which are incorporated herein by reference.

BACKGROUND

1. Technical Field

Embodiments discussed herein generally relate to techniques for accessing a storage device of a computer platform. More particularly, certain embodiments relate to accessing a storage device of a platform independent of a call to a host operating system of the platform to request such access.

2. Background Art

In a conventional computer platform, access control mechanisms are enforced by native file management of a host operating system (OS) on the platform. In a typical example, the host OS may receive a request from an agent of the platform to access some storage medium of the platform. In response to such a request, the host OS will refer to its file management system to determine, for example, whether an access permission indicates that the requested access is to be allowed (or denied). If an access permission is identified as allowing the requested access, the host OS will implement a driver process to access the storage device on behalf of the requesting application.

With continued advancement in various computer technologies (e.g. system management, virtualization, cloud networking, etc.) comes increasingly varied and/or complex relationships between a host OS of a computer platform and one or more agents on (or communicating with) that platform. For example, as computer platforms are asked to support increasingly complex security management operations, basic input/output system (BIOS) provisioning, cloud computing, virtualization and/or the like, such platforms face increasing performance overhead under increasingly time-sensitive performance constraints. For certain types of access to a platform storage device, the need to enforce access control mechanisms via the host OS has, to date, been considered an inherent part of such performance overhead.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments discussed herein variously provide access control mechanisms for an agent of a computer platform to access a storage device in the platform. Certain embodiments, for example, include techniques for an application or other agent to perform an access which is independent of a system call to the host operating system's native file management system. Such access control techniques may be used, for example, to access a type of Object-based Storage Device (OSD) of the platform. Storage media of the OSD may, for example, be represented in the platform as one or more regions (objects) which, for example, may be identified and accessed using respective region identifiers. To avoid obscuring features of various embodiments, the terms "application optimized" and "application adaptive" are used as a shorthand herein to refer to mechanisms which exhibit, implement and/or exploit the feature of an application (or other agent) of a platform accessing a storage media independent a call to a native file management system of a host OS to request such access.

Certain embodiments enforce access control for application optimized operations at an application and/or region level of granularity. Certain embodiments additionally or alternatively provide access control for storage regions which are invisible to the host OS—e.g. where a region of an OSD is only visible to a management agent of the computer platform which operates independent of the host OS. For example, certain embodiments provide access control for out-of-band provisioning of information, for reduced virtual machine monitor (VMM) overhead communication and/or the like. Such access control may, for example, be implemented for access by an out-of-band management agent managing a targeted virtualized and/or cloud ("soft") server system. Alternatively or in addition, trusted in-band storage may be provided—e.g. if a BIOS system management mode (SMM) handler of the platform needs to store or read secure information (e.g. code and/or data), certain embodiments provide an access control mechanism specific to such types of access.

In an embodiment, access control functionality may be implemented at least in part by mechanisms which are variously distributed through the platform—e.g. by respective components in the host OS kernel space, in a memory space allocated to an application and/or in the OSD storage device itself.

Figure 1:
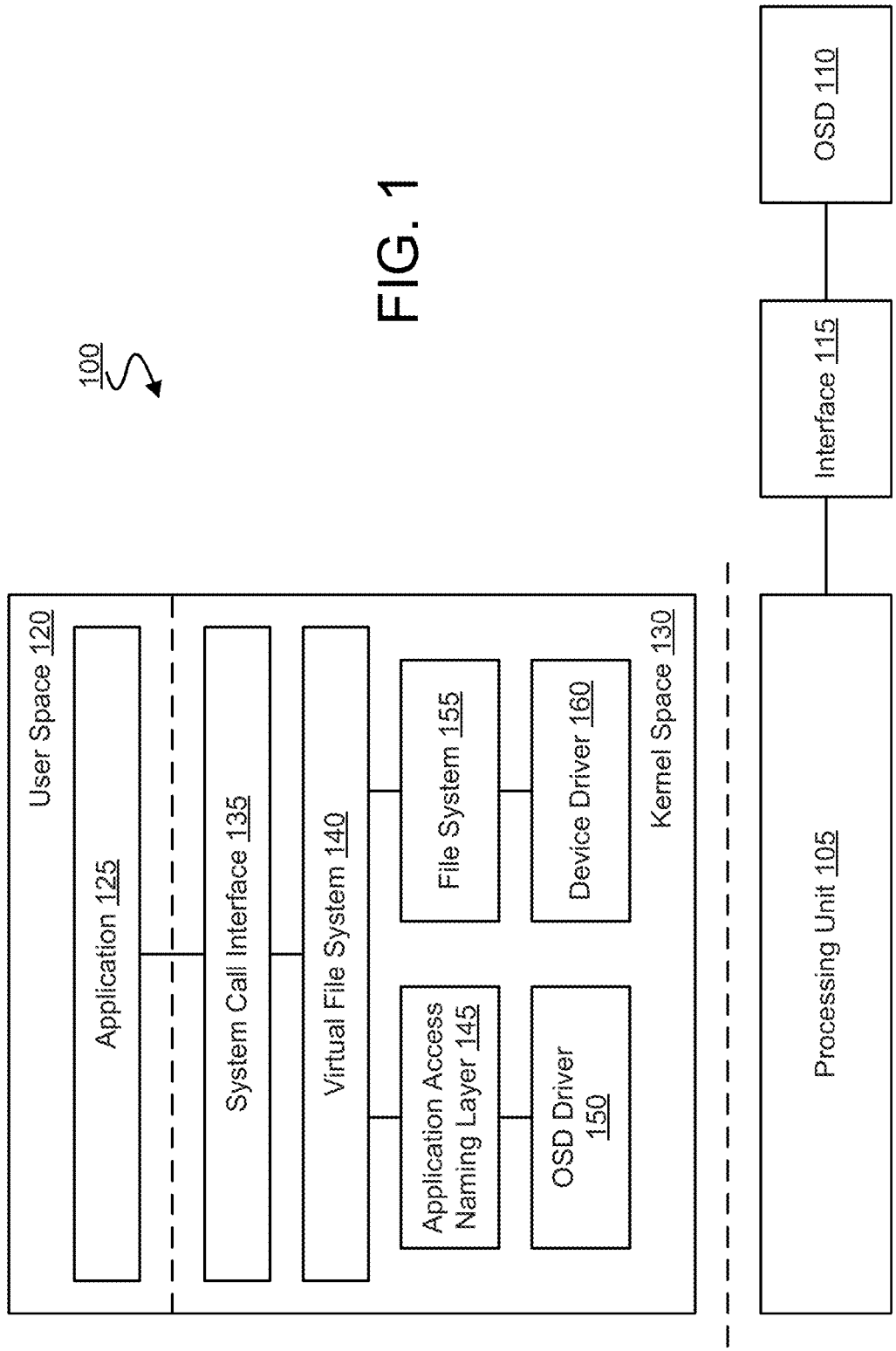
FIG. 1 is a block diagram illustrating select elements of a computer system for accessing a storage device according to an embodiment.

FIG. 1 illustrates select elements of a computer system 100 for accessing a storage medium according to an embodiment. Computer system 100 may include, for example, a desktop computer, a laptop computer, a handheld or other portable computer such as a tablet, a personal digital assistant (PDA), a smart phone, a messaging device, a digital music player, a digital camera, or other such system capable of processing, storing, transmitting and/or receiving information.

In an embodiment, computer system 100 includes hardware comprising a processing unit 105 and an object-based storage device 110 (or OSD) which are directly or indirectly coupled to one another via some hardware interface 115. Processing unit 105 may include any of a variety of combinations of one or more single core and/or multi-core processors to execute a host operating system (OS) of computer system 100.

Interface 115 may include any of a variety of combinations of one or more component circuit elements to directly or indirectly connect processing unit 105 and OSD 110 to one another. By way of illustration and not limitation, interface 115 may include one or more busses such as an address bus, data bus and/or control bus. Alternatively or in addition, interface 115 may include one or more control signal lines—e.g. to provide for control by an out-of-band management agent (not shown), where "out-of-band" refers to an agent's operating independent of (for example, in parallel with or in respective alternating processor modes with) a host OS of computer system 100. Alternatively of in addition, interface 115 may include one or more chipset components including, but not limited to, an I/O controller hub, a memory controller hub, and/or the like. Certain embodiments are not limited with respect to the particular interface elements coupling processing unit 105 and OSD 110.

By way of illustration and not limitation, access to OSD 110 by processing unit 105 may include interface 115 implementing data and/or command communications in accordance with, for example, one or more of a Small Computer Systems Interface (SCSI) protocol, a SCSI over Internet Protocol (iSCSI), a Serial Attached SCSI (SAS) protocol, a Universal Serial Bus (USB) protocol, a Serial Advanced Technology Attachment (S-ATA) protocol and/or the like.

In accordance with an embodiment, where interface 115 implements such communications in accordance with SCSI protocol, the SCSI protocol may comply and/or be compatible with the protocol described in American National Standards Institute (ANSI) Small Computer Systems Interface-2 (SCSI-2) ANSI/InterNational Committee for Information Technology Standards (INCITS) 131-1994 Specification. Where interface 115 implements such communications in accordance with iSCSI protocol, the iSCSI protocol may comply and/or be compatible with the protocol described in "Internet Small Computer Systems Interface (iSCSI)" Network Working Group, Request for Comments: 3720, RFC-Proposed Standard (IETF Stream) published April 2004 by the Internet Engineering Task Force, Internet Engineering Task Force Secretariat c/o Corporation for National Research Initiatives, 1895 Preston White Drive, Suite 100, Reston, Va. 20191, United States of America. Where interface 115 implements such communications in accordance with SAS protocol, the SAS protocol may comply and/or be compatible with the protocol described in ANSI Standard "Information Technology—Serial Attached SCSI (SAS-2), ANSI/INCITS 457-2010 Specification. Where interface 115 implements such communications in accordance with the Universal Serial Bus (USB) Attached SCSI (UAS) protocol, the UAS protocol may comply and/or be compatible with the protocol described in Information Technology—USB Attached SCSI (UAS) T10 Working document T10/2095-D Revision 4 Mar. 9, 2010. Where interface 115 implements such communications in accordance with S-ATA protocol, the S-ATA protocol may comply and/or be compatible with the protocol described in Serial ATA Revision 3.0 Specification, published on Jun. 29, 2009. Of course, alternatively or additionally, interface 115 may implement such communications via one or more other and/or additional protocols without departing from this embodiment.

OSD 110 may include a storage medium (not shown) and logic to determine an access permission for an agent of computer system 100 which requests access to such a storage medium. As used herein, "storage" may mean one or more apparatus and/or one or more portions thereof into, and/or from which, data may be stored and/or retrieved, respectively. Also as used in herein, the terms "mass storage" and "mass storage device" may be used interchangeably to mean storage capable of non-volatile storage of data. Storage may comprise respective mass storage that may comprise respective semiconductor, electromechanical, magnetic, and/or optical storage and/or mass storage, such as, for example, respective flash, magnetic disk, and/or optical disk storage and/or mass storage. Storage may be, for example, a hard disk drive, solid state drive, hybrid disk drive, Digital Video Disk (DVD) drive, Compact Disk (CD) drive, Redundant Array of Independent Disks (RAID), tape drive or other storage device. As discussed herein, one or more regions of the storage medium in OSD 110 may be variously represented in computer system 100 as regions (objects)—e.g. which are of definable (variable) length. Some functionality of OSD 110 may be according to conventional object-based storage techniques. By way of illustration and not limitation, OSD 110 may provide or otherwise support certain storage mechanisms such as those set forth in the "Object-based Storage Device Commands-2 (OSD-2)" standard from the T10 committee of the International Committee for Information Technology Standards (INCITS), January, 2009. Certain embodiments variously provide additional mechanisms which extend or otherwise modify conventional object-based storage techniques to provide an agent with access to OSD 110 which is independent of a system call to the host OS of computer system 100 to request or otherwise describe such access.

In an embodiment, processing unit 105 may execute a host OS which, in turn, supports one or more applications also executing with processing unit 105. To illustrate certain features of various embodiments, such execution by processing unit 105 is supported in computer system 100 by an illustrative kernel space 130 (for the host OS) in main memory and by an illustrative user space 120 in main memory. OSD 110 may be distinguished, for example, from the main memory (not shown) which underlies user space 120. Accordingly, interface 115 may be distinguished, for example, from a memory bus (not shown) by which processing unit 105 accesses from main memory state information representing state for application 125. User space 120 may include at least one component space allocated for an application 125, which may request access to OSD 110. Application 125 may, for example, execute in a limited privilege (e.g. Ring 3) protection domain established by the host OS. In an embodiment, application 125 is a process of a virtual machine running on computer system 100—e.g. where kernel 130 is for an execution environment of a virtual machine monitor (VMM) supporting the virtual machine. It is understood that any of a variety of additional or alternative applications or other agents may be supported by the host OS represented by kernel space 130.

Application 125 may make one or more calls to kernel space 130—e.g. to variously access one or more resources of computer system 100. In an embodiment, application 125 may signal a system call interface 135 of kernel space 130 that it wants to avail of a some conventional file management functionality of the host OS—e.g. for the host OS to perform on behalf of application 125 a read, write, delete, etc. access to some storage device of computer system 100. In response to such a request, a host OS process may access a file system 155 of kernel space 130 to determine whether and/or how the access is to take place. For example, the host OS may identify a given storage device (e.g a particular hard disk drive, solid state drive and/or the like), file, folder, etc. from a file system 155 of kernel space 130 to determine whether application 125 is associated with an access permission for the requested access to such drive, file, folder, etc. If such access permission is determined to be associated with application 125, a device driver 160 of kernel space 130 may access a storage device of computer system 100 (e.g. some device other than OSD 110) on behalf of application 125.

In certain embodiments, kernel space 130 may include, or otherwise have access to, additional application optimized access control functionality which, compared to the access discussed above, supports relatively more direct access by application 125 to OSD 110. Some of such application optimized access control functionality is represented in kernel space 130 by an illustrative application access naming layer 145 and an illustrative OSD Driver 150. OSD 110 may be considered application adaptive non-volatile (AAN) memory in certain embodiments, at least to the extent that application adaptive access control functionality provides for access to OSD 110 which is independent of a call to the host OS of computer system 100.

Application access naming layer 145 (alternately referred to herein as an AAN naming layer, or "ANL") may include a file system which provides a file-like abstraction for one or more regions of OSD 110. Application access naming layer 145 may, for example, give a local user, a system administrator, an operating system, an application or other agent an ability to provide or otherwise determine user-friendly names for storage regions in OSD 110. Application access naming layer 145 may be mounted into the host OS's virtual file system 140 from any of a variety of types of storage media of computer system 100.

As discussed herein, application access naming layer 145 may support application-specific and/or region-specific access control—e.g. providing mechanisms to associate one or more of applications, users, regions etc. with Portable Operating System Interface for Unix (POSIX) style access permissions (e.g. read, write, execute, etc.) and to maintain those associations in a non-volatile directory structure. In an embodiment, one or more regions of the OSD 110 are represented in the application access naming layer 145 as respective storage devices (e.g one or more hard disk drives and/or solid state drives), folder names, file names and/or the like, each associated with respective access permissions (e.g. Read, Write, Delete, Execute and/or the like). The application access naming layer 145 may implement a POSIX-style access control scheme that specifies distinct permissions for regions—e.g. on a per-application and/or other per-agent basis—using conventional (e.g. Owner, Group or other) categories. Application 125 may, in an embodiment, query application access naming layer 145 to determine which regions are contained on OSD 110, to view permissions to access such regions, to modify a permission for a region over which it has control, and/or the like.

In an embodiment, the one or more regions of OSD 110 represented in application access naming layer 145 are only a subset of all regions in OSD 110. Other regions of OSD 110 may, for example, be undetectable (referred to herein as invisible) to the host OS due to some configuration in computer system 100.

By way of illustration and not limitation, computer system 100 may include one or more out-of-band (OOB) system management agents capable of managing which information regarding regions of OSD 110 is to be provided to kernel space 130. Such a management agent may configure OSD 110—and/or other elements of computer system 100—to prevent information describing a particular region or regions of OSD 110 from being mounted into application access naming layer 145.

One such management agent may, for example, execute on a dedicated processor (not shown) separate from the processor of processing unit 105 which executes processes of the host OS. Alternatively or in addition, such a management agent may execute during a system management mode of processing unit 105—e.g. where processing unit 105 alternates between the system management mode and a mode for executing processes of the host OS.

Application access naming layer 145 may also be responsible for communicating access policies with OSD 110—e.g. via OSD driver 150—in order for OSD 110 to associate application 125 with an access permission. Such association may later be referenced by OSD 110 for granting a subsequent access request of application 125. With access control mechanisms provided by application access naming layer 145, application 125 may bypass file system 155 and access OSD 110 independent of having to specify such access in a request to system call interface 135. Different applications of the computer system 100 may thus access the OSD 110 in a safe manner—e.g. each application access according to a respective application-specific permission which is agreed between or otherwise determined by kernel space 130 and access control logic of OSD 110 during a registration phase prior to such access.

Figure 2:
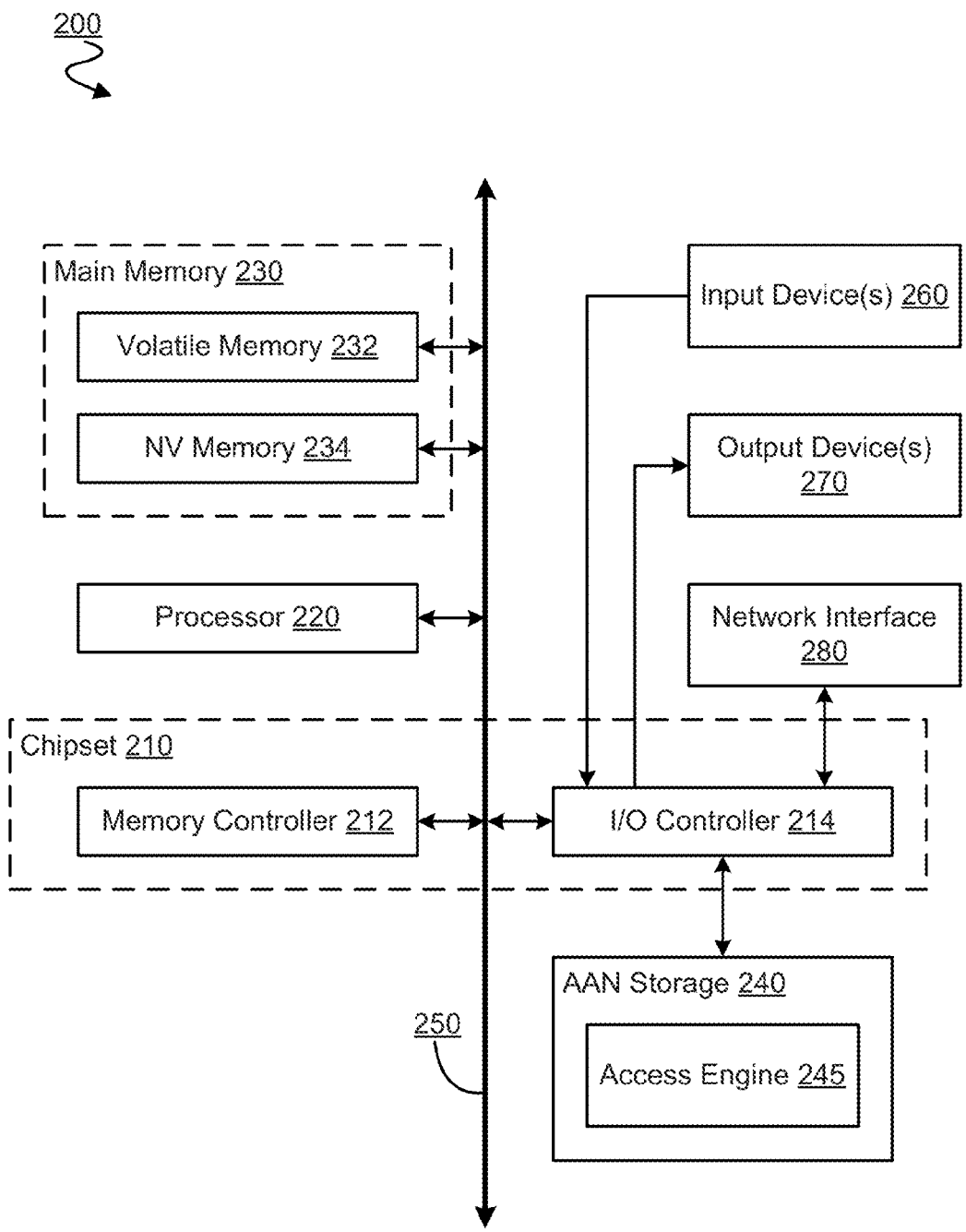
FIG. 2 is a block diagram illustrating select elements of a computer platform for accessing a storage device according to an embodiment.

FIG. 2 illustrates select elements of a computer platform 200 for accessing a storage medium according to an embodiment. Computer platform 200 may include hardware to provide some or all of the features of computer system 100, for example.

Computer platform 200 may be a platform of a desktop computer, a laptop computer, a handheld computer, a tablet computer, a PDA, a server, an Internet appliance, and/or any other type of computing device. In an embodiment, computer platform 200 includes a chipset 210 having, for example, a memory controller 212 and an input/output (I/O) controller 214. Chipset 210 may provide memory and I/O management functions, as well as a plurality of general purpose and/or special purpose registers, timers, etc. that are accessible or used by a processor 220 of computer platform 200. Processor 220 may be implemented using one or more single chip and/or multi-chip processing components. For example, processor 220 may be implemented using one or more of the Intel Pentium® technology, the Intel Itanium® technology, the Intel Centrino® technology, the Intel Xeon® technology, and/or the Intel XScale® technology. Additionally or alternatively, other processing technology may be used to implement processor 220.

Memory controller 212 may perform functions that enable processor 220 to access and communicate via an interconnect 250 with a main memory 230 having, for example, a volatile memory 232 and a non-volatile memory 234. Volatile memory 232 may include any of a variety of combinations of one or more random access memory devices including, but not limited to, Synchronous Dynamic Random Access Memory (SDRAM), Dynamic Random Access Memory (DRAM), RAMBUS Dynamic Random Access Memory (RDRAM), and/or the like. Non-volatile memory 234 may include, for example, an array of non-volatile memory devices (e.g., chips) comprising non-volatile memory cells. In an embodiment, non-volatile memory 234 includes, for example, one or more of NAND flash memory, NOR flash memory, magneto-resistive random access memory, nanowire, phase-change memory and/or the like. Non-volatile memory 234 may comprise single-level or multi-level memory cells, or a combination thereof. For embodiments in which non-volatile memory 234 comprise phase-change memory, the phase-change memory cells may comprise vertically integrated memory cells in which a phase-change memory element is layered with an Ovonic Threshold Switch (OTS) in a cross-point. Though not illustrated, non-volatile memory 234 may be arranged in accordance with conventional memory devices by including, for example, a plurality of addressable memory banks, each including a plurality of memory cells arranged in rows and columns, forming wordlines and bitlines, respectively. The memory banks may contain addressable blocks (or sectors) of memory cells.

Interconnect 250 may include any of a variety of combinations of one or more component signal lines to variously interconnect components of computer platform 200 with one another. By way of illustration and not limitation, interconnect 250 may include one or more busses such as an address bus, data bus and/or control bus. Alternatively or in addition, interconnect 250 may include one or more control signal lines—e.g. to provide out-of-band control—e.g. by a security processor, a system management mode of a host processor, a remote boot agent and/or the like—which is independent of (for example, in parallel with) a host OS running on processor 220. Alternatively or in addition, interconnect 250 may include one or more of a universal serial bus (USB) interface, a third generation input/output interface (3GIO) interface, a PCI or PCI Express bus and/or any other suitable type of component interconnect circuitry.

One or more input devices 260 of computer platform 200 may be connected to interconnect 250—e.g. via I/O controller 214. Input device(s) 260 may permit a user to enter data and commands into processor 220. For example, input device(s) 260 may include one or more of a keyboard, a mouse, a touch-sensitive display, a track pad, a track ball, a voice recognition system and/or the like. Alternatively or in addition, one or more output devices 270 of computer platform 200 may be connected to interconnect 250—e.g. via I/O controller 214. For example, output device(s) 270 may include one or more of a light emitting display (LED), a liquid crystal display (LCD), a cathode ray tube (CRT) display, a printer, a speaker and/or the like.

In an embodiment, computer platform 200 includes a network interface 280—e.g. a modem and/or network interface card—to facilitate wired and/or wireless data exchanges with one or more networks (not shown). By way of illustration and not limitation, network interface 280 may include an antennae and/or circuit logic to communicate via any of a variety of types of network connections including, but not limited to, an Ethernet connection, a digital subscriber line (DSL), a telephone line, a cellular telephone system, a coaxial cable, a wireless router, etc.

I/O controller 214 may, for example, perform functions that enable processor 220 to communicate with input device(s) 260, output device(s) 270, network interface 280 and/or the like. Although certain embodiments are not limited in this regard, I/O controller 214 may additionally or alternatively provide processor 220 with access to an AAN storage 240 of computer platform 200. AAN storage 240 may, for example, include some or all of the features of OSD 110. AAN storage 240 may include storage medium (not shown) for storing data to be read and/or written by one or more agents of computer platform 200. In an embodiment, AAN storage 240 includes an access engine 245—e.g. a state machine or other hardware logic—to determine an access permission for an application or other agent requesting application optimized access to the storage medium. Based on determining such access permission, access engine 245 may, for example, generate one or more signals which directly or indirectly determine whether or how data is to be read from and/or written to a storage media of AAN storage device 240.

By way of illustration and not limitation, access engine 245 may generate one or more signals to selectively permit and/or prohibit the gating of a data bus and/or an address bus of AAN storage device 240. Any of a variety of additional or alternative mechanisms may be implemented by access engine 245 to selectively allow and/or prohibit such reads and/or writes.

Computer platform 200 may include a system management agent capable of managing which information regarding regions of AAN storage 240 is to be provided to a host OS running on processor 220. One such management agent may, for example, execute on a dedicated processor (not shown) which is separate from processor 220. Alternatively or in addition, such a management agent may execute on processor 220 during a system management mode—e.g. where processor 220 alternates between the system management mode and a mode for executing processes of the host OS.

In an embodiment, such a management agent may store in AAN storage 240 configuration information to describe which regions are to be made visible (or invisible) to the host OS. Based on such configuration, AAN storage 240 may selectively prevent information describing one or more invisible regions from being loaded into an AAN naming layer of a kernel space for the host OS.

Access to invisible regions of AAN storage 240 may be limited according to, or otherwise predicated upon, AAN storage 240 detecting an indication that such access is not for the host OS. For example, AAN storage 240 may exchange information describing such invisible regions on a dedicated management communication channel which is isolated from the host OS. Alternatively or in addition, AAN storage 240 may exchange information describing such invisible regions in response to detecting that processor 220 is not currently operating in a mode for executing processes of the host OS. For example, AAN storage 240 may detect some signal—e.g. a provided via a system management interrupt virtual legacy wire (SMI-VLW)—which indicates that processor 220 is operating in a system management mode. Based on detecting such a signal, AAN storage 240 may accept an associated request to access information corresponding to a region which is invisible to the host OS.

Computer platform 200 is illustrative of one architecture for implementing application optimized access according to an embodiment. One or ordinary skill in the computing arts would understand from the discussion herein that such architecture may include any of a variety of additional or alternative components—and/or any of a variety of additional or alternative configurations thereof—to implement techniques described herein.

Figure 3:
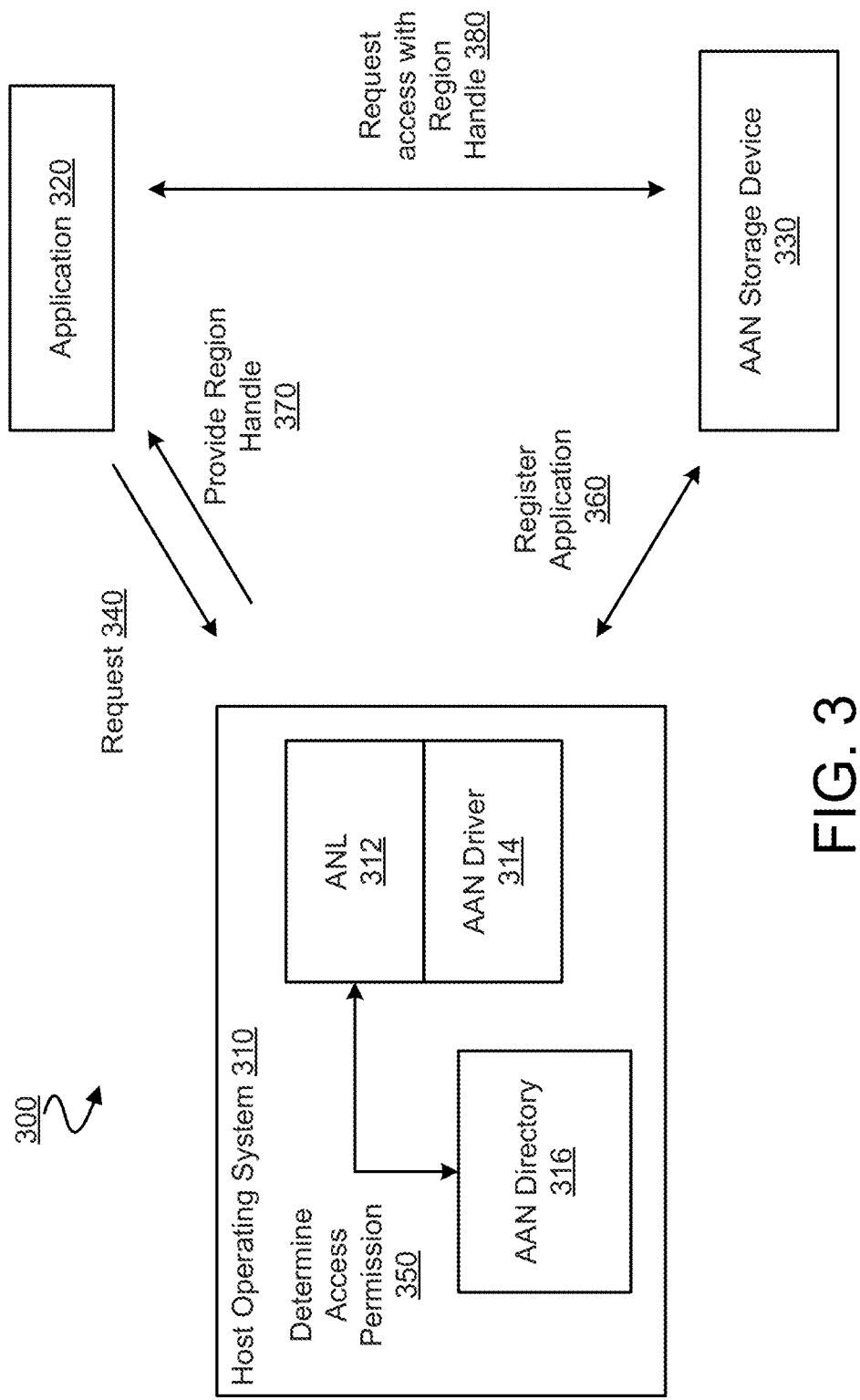
FIG. 3 is a sequence diagram illustrating select elements of a communication exchange for providing access to a storage device according to an embodiment.

FIG. 3 illustrates select elements of a communication exchange 300 for providing access to a storage device according to an embodiment. Communication exchange 300 may take place, for example, among components of a platform including some or all of the features of computer platform 200.

In an embodiment, communication exchange 300 includes various messages exchanged among a host OS 310 of a computer platform, an application 320 of the platform which is supported by host OS 310 and an AAN storage device 330 of the platform. Application 320 and AAN storage device 330 may, for example, include some or all of the features of application 125 and OSD 110, respectively. Access control functionality for application optimized accesses to AAN storage device 330 may be implemented at least in part by a combination of mechanisms which are distributed throughout the platform—e.g. by an AAN Naming Layer (ANL) 312 and an AAN Driver 314 of host OS 310, by information and/or locations in the memory space for application 320 and/or by other access control mechanisms of the AAN storage device 330.

Certain embodiments include a mechanism to identify and authenticate a user and/or application making an access request to AAN storage device 330. Such mechanisms may include, for example, a protection domain identifier (PDID) to specify which application is making a particular access request. A PDID, or information corresponding thereto, may be included in, or otherwise available to, a controller residing on AAN storage device 330—e.g. wherein the PDID is later accessed as reference information for identifying the requesting application.

In an embodiment, the PDID of application 320 may not be easily spoofed by another application, malicious agent, etc. since ANL 312 binds the PDID to the memory space of application 320 and guards the PDID with memory protections of host OS 310. Therefore, spoofing such an application's PDID may require breaking the native memory protections afforded by the host OS 310. In the illustrative case of computer system 100, such memory protections may, for example, be afforded by a VMM (not shown) running in user space 120 of computer system 100—e.g. where application 125 is running in a virtual machine (not shown) which is managed by such a VMM.

An application which is to perform application optimized access of AAN storage device 330 may first go thru a memory registration process with host OS 310. The registration process may include application 320, host OS 310 and AAN storage device 330 variously agreeing or otherwise determining one or more locations, identifiers or other information for later use in implementing an application optimized access of AAN storage device 330 by application 320.

For example, host OS 310 and application 320 may agree or otherwise determine a first location (e.g. data buffer, I/O page, queue and/or the like) in the memory space allocated to application 320, where host OS 310 is to perform a configuration—e.g. a memory mapping—to correspond such first location to a second location (e.g. data buffer, I/O page, queue and/or the like) in AAN storage device 330. Based on such configuration, a subsequent write to the first location by application 320 may cause an automatic write to the second location in AAN storage device 330. As a shorthand, this causal relation of a write to one location and a write to another location is referred to herein as a doorbell feature. The term "doorbell" refers to the fact that, for example, AAN storage device 330 may detect from the resulting write to the second location, that a causal write has been performed to the corresponding first location by application 320. AAN storage device 330 may thereby identify—e.g. independent of a system call to host OS 310—that application 320 is seeking some access.

Alternatively or in addition, the registration process may include host OS 310 and application 320 agreeing or otherwise determining one or more of an identifier of a region of AAN storage device 330 which application 320 may later seek to access, a PDID or other identifier with which application 320 may identify itself, a permission which has been given (or is to be given) to application 320 for a particular access to the particular region of memory in AAN storage device 330, and/or the like.

The registration process may further include host OS 310 and AAN storage device 330 agreeing on one or more of the second location which host OS 310 is to configure for correspondence with the first location of application 320, the PDID or other identifier of application, 320, the identifier of the region of AAN storage device 330 which application 320 may later seek to access, the access permission which has been given (or is to be given) to application 320 for such region, and/or the like.

By way of illustration and not limitation, a set of one or more locations of the memory space allocated for application 320—e.g. one or more I/O pages—may be registered for association with (e.g. mapping to) a PDID which AAN device 320 later uses for the purpose of identifying application 320 and a corresponding access permission. The PDID may be used by AAN storage device 330 to perform an access permission check when application 320 makes an I/O request for an application optimized access—e.g. to read and/or write to a specified region of AAN storage device 330.

Prior to application 320 accessing a region of AAN device 330, host OS 310 may register one or more I/O locations of application 320 and may determine a PDID for such access—e.g. in response to a request from application 320. In an embodiment, ANL 312 may check whether application 320 is to be provided rights to access the region of the AAN device. If ANL 312 determines that application 320 is to be allowed an access permission, ANL 312 may propagate access information—e.g. a PDID (identifying application 320), a region ID for a region of AAN device 330 and/or an identifier of the allowed access type (Read or Write)—to AAN device 330 via AAN driver 314. AAN storage device 330 may maintain such access control information in a region permission structure in AAN device 330. Such region permission information may, for example, be kept in a table or other data structure that is populated with a new entry each time a request to create or access an object of AAN storage device 330 is made by the AAN driver 314.

Application 320 may send to host OS 310 a message 340 which explicitly or implicitly requests a region handle (RTag) for a region of AAN storage device 330. Alternatively, registration of application 320 may be initiated by some other agent of the platform. In response to the message 340, the host OS 310 may determine, at 350, an access permission for controlling application-optimized access of the region by application 320. If, for example, message 340 is for application 320 to request creation of the region for the first time, ANL 312 may register the region and one or more access permissions for the region within the virtual file system of host OS 310—e.g. in an AAN directory 316 which describes regions of AAN storage device 330. AAN directory 316 may be included in or otherwise accessible to ANL 312, in an embodiment. If message 340 is for application 320 to request access to a previously created region of AAN storage device 330, ANL 312 may query native policy management functionality (not shown) of host OS 310 for an access permission for the region. The policy manager may respond with a permission that is configured for the region.

Having determined access permissions at 350, ANL 312 may signal AAN driver 314 to register a region access control policy with AAN device 330. By way of illustration and not limitation, AAN driver 314 may register the application, at 360—e.g. including communicating to, or otherwise agreeing with, AAN storage device 330 a PDID and/or a location to associate with application 320. Alternatively or in addition, AAN device 330 may allocate, and provide via AAN driver 314, a region handle (RTag) for application 320 to use in application-optimized accesses to the region. ANL 312 may, at 370, return to application 320 the RTag which was determined with AAN storage device 330.

With the region identifier RTag, application 320 may, at some later point in time, place a work request 380 into a registered location of its memory space to perform application-optimized I/O with the desired region of AAN device 330. A controller in the AAN device 330—e.g. having some or all of the features of access engine 245—may validate access to the region by comparing the access type in work request 380 with the pre-registered information for that PDID—e.g. allowing or denying access based on the check.

Figure 7:
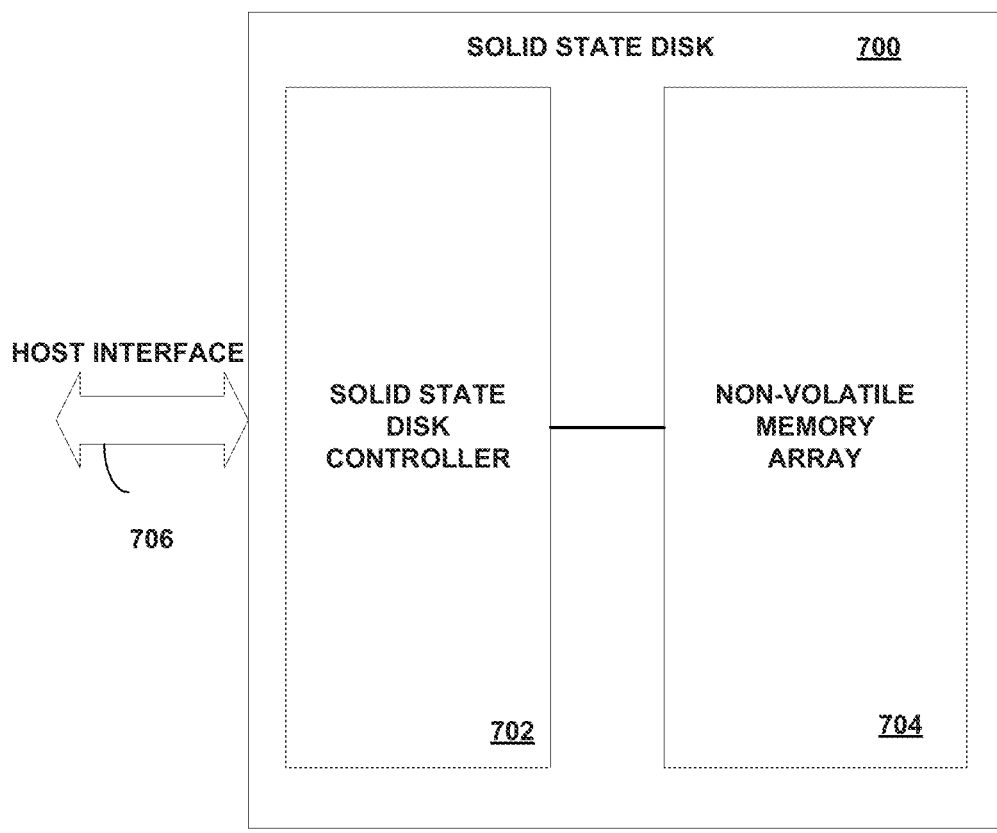
FIG. 7 is a block diagram illustrating select elements of a solid state disk device according to an embodiment.

FIG. 7 is a block diagram of an embodiment of a solid state disk 700. Solid state disks (also "solid state drives") use semiconductor memories, also referred to as solid state memories, as a storage medium. Semiconductor memories are comparatively more rugged than hard drives and offer the advantage of being much less sensitive to vibration, dust, humidity, and sudden changes in velocity. Semiconductor memories also tend to require less power than a typical hard drive with similar storage capacity.

Solid state disk 700 includes a solid state disk controller 702 to control nonvolatile memory array 704. Solid state disk 700 communicates with a host controller via a host interface 706. The solid state disk controller 702 controls reading, writing and erasing of the nonvolatile memory array 704. Solid state disk 700 may includes some or all of the features of AAN storage 240—e.g. where access engine 245 is incorporated into, or otherwise coupled to control, solid state disk controller 702.

Figure 4:
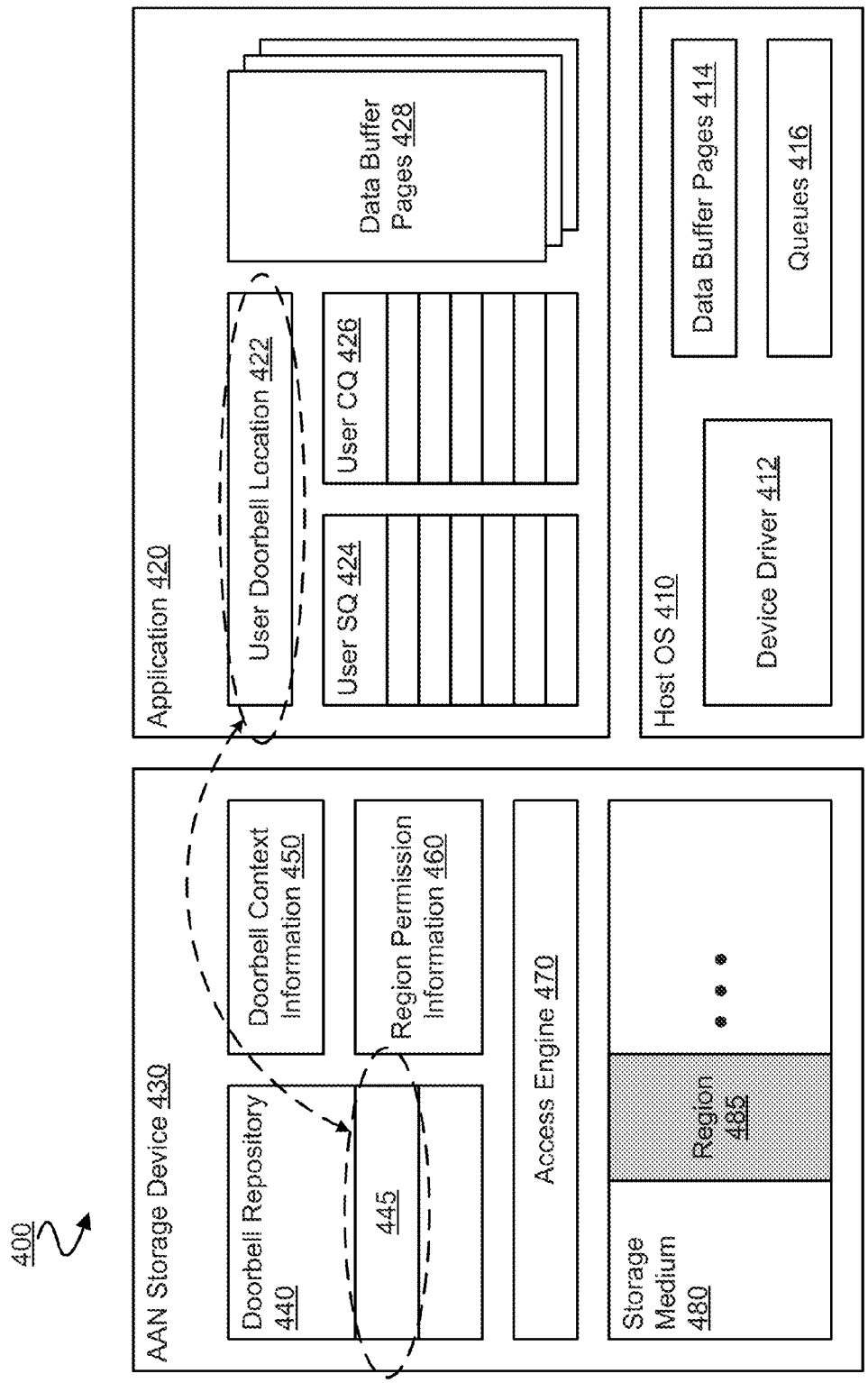
FIG. 4 is a block diagram illustrating select elements of a computer platform for accessing a storage device according to an embodiment.

FIG. 4 illustrates select elements a computer platform 400 including data structures to provide access to a storage device according to an embodiment. Computer platform 400 may, for example, include some or all of the features of computer platform 200.

Computer platform 400 may include a host OS 410 executing on a processing unit (not shown) and including various structures in main memory—e.g. represented by an illustrative device driver 412, data buffer pages 414 and queues 416. Device driver 412 may provide functionality for host OS 410 to control one or more components of computer platform 400, and data buffer pages 414 and queues 416 may store various state information of host OS 410. By way of illustration and not limitation, device driver 412 may include some or all of the functionality of AAN driver 314, whereas data buffer pages 414 and queues 416 may variously store current and/or pending process state, reference data, etc. of an ANL.

Furthermore, computer platform 400 may include an AAN storage device 430 such as a hard disk drive, solid state drive, etc., the AAN storage device 430 having a storage medium 480—e.g. including NAND flash memory media, NOR flash memory media, magneto-resistive random access memory media, nanowire media, or phase-change memory media and/or the like—which is available for application-optimized access. In an embodiment, AAN storage device 430 includes an access engine 470—i.e. any of a variety of combinations of hardware, firmware and/or executing software—to detect a request for an application-optimized access and to evaluate whether to allow or deny such application-optimized access. AAN storage device 430 may further include various registration information to be referenced by access engine 470 in determining whether to allow a requested application-optimized access.

Computer platform 400 may further include an application 420 executing on the processing unit and including various structures in main memory—e.g. represented by illustrative data buffer pages 428, user send queue 424, user complete queue 426 and/or the like. To communicate with AAN storage device 430, application 420 may allocate and register one or more of its locations (e.g. a user doorbell location 422, one or more data buffer pages 428, user SQ 424 and/or the like) in main memory, thru an AAN driver of host OS 410 (e.g. device driver 412), with AAN device 430. Registration may include AAN device 430 and the AAN driver of host OS 410 agreeing to a PDID which both the kernel of host OS 410 and AAN device 430 associate with the addresses of the application memory space which were registered as part of the registration process. The AAN device 430, or the AAN driver of host OS 410, may assign a doorbell address and map that address into the application's memory map. In an embodiment, the PDID of application 420 is the index of the doorbell address.

In an embodiment, the host OS 410 may perform a memory map to map a location 445 of a doorbell repository 440 in AAN device 430 directly to user doorbell location 422 of application 420. Such a memory map will may provide means for the application to perform a memory map I/O write to the location 445 to interrupt AAN storage device 430.

For example, application 420 may indirectly write to location 445 an access request message which includes or otherwise indicates a PDID for application 420, an RTag for the region to be accessed, and/or the like.

In response to detecting the write to location 445, access engine 470 may use information in the request message to access doorbell context information 450, previously generated for registration of application 420 with AAN storage device 430.

Doorbell context information 450 may, for example, confirm or otherwise describe an association of location 445 with the PDID or other identifier of application 420, the location one or more regions (e.g. user SQ 424, data buffer pages 428 and/or the like) of the memory space of application 420 which are a target or source of a requested data exchange, and/or the like. Based on doorbell context information 450, access engine 470 may authenticate the application making the request and/or identify to where and/or from where data is to be exchanged.

In an embodiment, access engine 470 may further access region permission information 460 which describes whether application 420 is associated with an access permission which allows the requested access. Based on information in doorbell context information 450 and/or region permission information 460, access engine 470 may perform the requested access for application 420.

Registration of application 420 by host OS 410 may enable application 420 to avail of application optimized access to one or more regions of AAN storage device 430. The mapping of user doorbell location 422 in the memory space of application 420 to location 445 of AAN storage device 430 is provided in an OS kernel bypass application programming interface (API) for reading from and/or writing to region 485 of AAN storage device 430. Certain embodiments leverage the native access control mechanisms of host OS 410 to represent and maintain permissions on regions of storage medium 480. However, due to registration of application 420, access control information may be distributed for later use by AAN storage device 430—the use independent of an OS system call from application 420 to host OS 410 itself—at the time access to the region 485 is actually requested by application 420.

Figure 5:
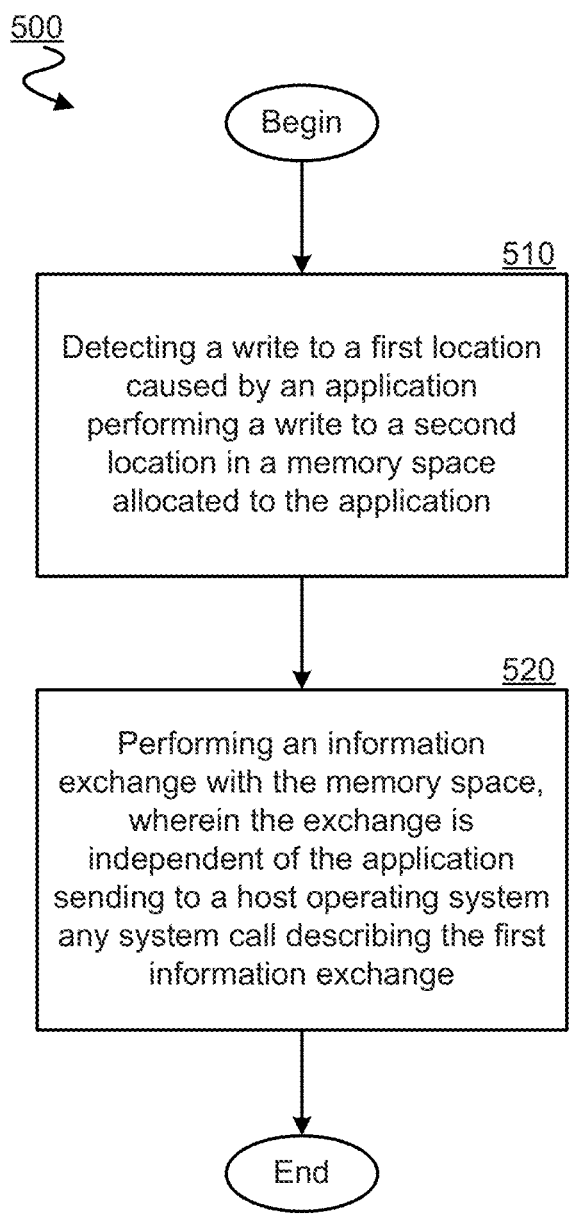
FIG. 5 is a flow diagram illustrating select elements of a method for providing access to a storage device according to an embodiment.

FIG. 5 illustrates select elements of a method for accessing a storage medium according to an embodiment. Method 500 may be performed by any of a variety of application-optimized object-based storage devices such as OSD 110. In an embodiment, method 500 is performed by access engine 470.

Method 500 may include, at 510, detecting a write to a first location of an OSD of a computer platform—e.g. the first location serving as a doorbell address for signaling an OSD. The write to the first location may be caused by an application of the computer platform performing a write to a second location in a memory space allocated to the application. The application may perform the write to the second location in order to request a first information exchange—e.g. an application optimized exchange between the memory space allocated to the application and the OSD.

In an embodiment, the application has been registered for access to a region of the OSD, the registration prior to the OSD detecting of the write to the first location. Such registration may include, for example, the OSD storing information associating the first location with the second location and/or with a PDID of the application. For example, an ANL of a host OS of the platform may have participated in an exchange of registration information with the application and the OSD, the exchange to allow access to the OSD by the application which does not require the application to make a system call to the native file system of the host OS.

The registration may include, or otherwise result in, a memory mapping of the first location to the second location. In an embodiment, such memory mapping is a basis for the write to the first location being caused by the write to the second location. The write to the first location may store an identifier of a memory region of the OSD which, the host OS previously provided to the application during the registration process. The OSD may evaluate the memory region identifier as part of a determination of whether to perform the access requested by the application.

Method 500 may further include, at 520, performing the first information exchange with the memory space, wherein the first information exchange is independent of the application sending to a host operating system of the computer platform any system call which describes the first information exchange. In an embodiment, the OSD determines an identifier of the application in response to detecting the writing to the first location. An access permission for the application may then be identified based on the determined identifier, wherein the first information exchange is granted (or denied) based on the identified access permission.

In certain embodiments, the OSD may detect one or more other requests for access which are independent of the host OS. For example, the OSD may detect a write to some third location of the OSD by a management agent of the computer platform. The write to the third location may, for example, be based on the management agent requesting a second information exchange. In response to detecting the write to the third location, the OSD may perform the second information exchange to access a memory region of the OSD which is invisible to the host OS. Such an exchange may, for example, be to access BIOS instructions from the OSD.

Figure 6:
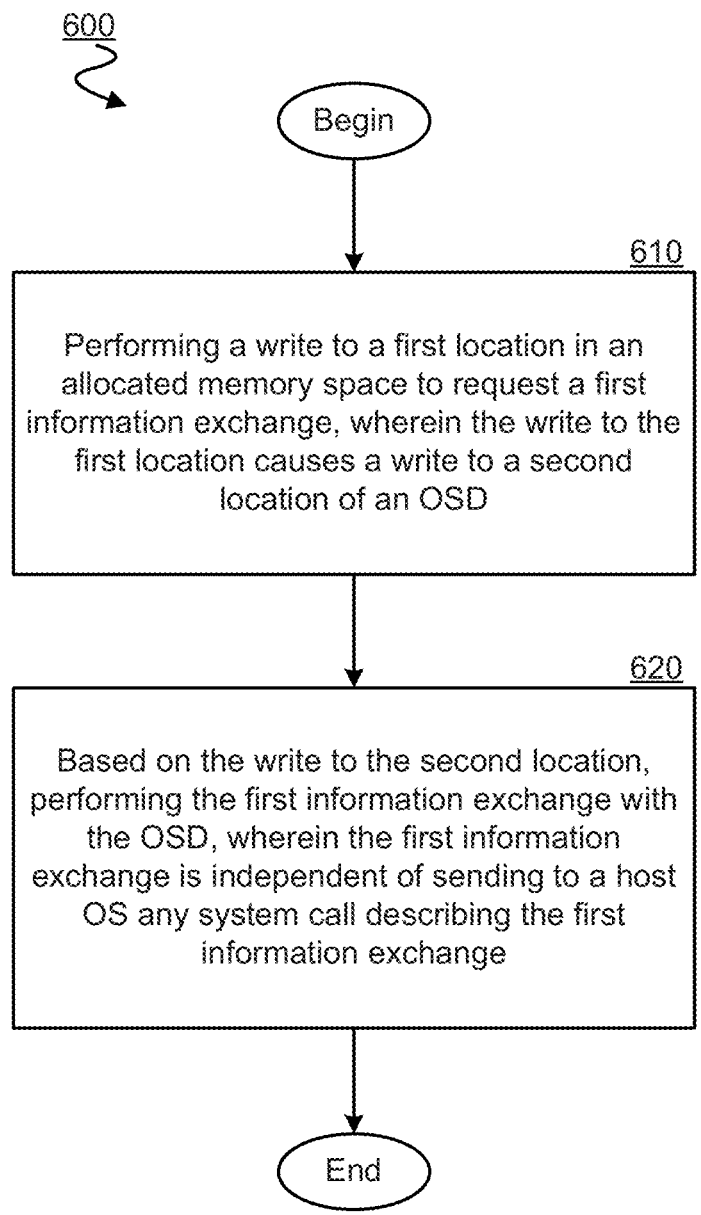
FIG. 6 is a flow diagram illustrating select elements of a method for accessing a storage device according to an embodiment.

FIG. 6 illustrates select elements of a method for accessing a storage medium according to an embodiment. Method 600 may, for example, be performed by an application executing on a computer platform which includes an application adaptive OSD. In an embodiment, method 600 is performed by an application having some or all of the features of application 420. Method 600 may represent, for example, a reciprocal method to that of method 500.

Method 600 may include, at 610, performing a write to a first location in a memory space allocated to the application. The writing to the first location may, for example, be performed to request a first information exchange—e.g. an exchange between the allocated memory space and the OSD. In an embodiment, the write to the first location causes a write to a second location of an OSD. In an embodiment, the first memory location and second location of method 600 correspond, respectively, to the second location and first location of method 500.

In an embodiment, the application further registers for access to a region of the OSD, the registration—e.g. prior to the application performing the write to the first location. Such registration may include, or otherwise result in, a memory mapping of the first location to the second location. In an embodiment, such memory mapping is a basis for the write to the first location resulting in the write to the second location.

Method 600 may further include, at 620, performing the first information exchange with the OSD based on the write to the second location. In an embodiment, the first information exchange is independent of the application sending to the host OS any system call describing the first information exchange.

Techniques and architectures for accessing a storage medium are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A method at an object-based storage device (OSD) of a computer platform, the method comprising:
   detecting a write to a first location of the OSD caused by an application of the computer platform performing a write to a second location in a memory space of a memory coupled to the OSD, the memory space allocated to the application, the write to the second location to request a first information exchange; and
   performing the first information exchange with the memory space, wherein the first information exchange is independent of the application sending to a host operating system of the computer platform any system call describing the first information exchange.

2. The method of claim 1, further comprising:
   determining an identifier of the application in response to detecting the writing to the first location; and
   identifying an access permission for the application based on the determined identifier, wherein the first information exchange is based on the identified access permission.

3. The method of claim 1, wherein the write to the first location stores an identifier of a memory region of the OSD provided to the application by the host operating system in response to a request from the application.

4. The method of claim 1, wherein the write to the first location is caused by the write to the second location based on a memory mapping of the first location to the second location.

5. The method of claim 1, wherein performing the first information exchange includes accessing a first memory region of the OSD, the method further comprising:
   receiving from the host operating system a registration of the application for access to the first memory region of the OSD.

6. The method of claim 1, further comprising:
   receiving a request to access a memory region of the OSD, wherein the host operating system is to be prevented access to information describing the memory region;
   detecting an indication that a processor is operating in a system management mode; and
   based on the detecting the indication, accepting the request to access the memory region of the OSD.

7. The method of claim 6, wherein the system management mode is for operation of a BIOS management agent.

8. An object-based storage device for operation in a computer platform, the object-based storage device comprising:
   a first location to receive a write caused by an application of the computer platform performing a write to a second location in a memory space of a memory coupled to the object-based storage device, the memory space allocated to the application, the write to the second location to request a first information exchange; and
   an access engine to detect the write to a first location, the access engine further to perform the first information exchange with the memory space, wherein the first information exchange is independent of the application sending to a host operating system of the computer platform any system call describing the first information exchange.

9. The object-based storage device of claim 8, wherein the access engine further to determine an identifier of the application in response to the write to the first location, and to identify an access permission for the application based on the determined identifier, wherein the first information exchange is based on the identified access permission.

10. The object-based storage device of claim 8, wherein the write to the first location stores an identifier of a memory region of the OSD provided to the application by the host operating system in response to a request from the application.

11. The object-based storage device of claim 8, wherein the write to the first location is caused by the write to the second location based on a memory mapping of the first location to the second location.

12. The object-based storage device of claim 8, wherein the access engine to perform the first information exchange includes the access engine to access a first memory region of the OSD, the access engine further to receive from the host operating system a registration of the application for access to the first memory region of the OSD.

13. The object-based storage device of claim 8, the access engine further to receive a request to access a memory region of the ODS, wherein the host operating system is to be prevented access to information describing the memory region, to detect an indication that a processor is operating in a system management mode, and based on the detecting the indication, to accept the request to access the memory region of the OSD.

14. The object-based storage device of claim 13, wherein the system management mode is for operation of a BIOS management agent.

15. A method by an agent executing with a processing unit of a computer platform, the method comprising:
   performing a write to a first location in a memory space allocated to the agent, the write to the first location to request a first information exchange between the memory space of a memory device of the computer platform and an object-based storage device (OSD) of the computer platform coupled to the memory device, wherein the write to the first location causes a write to a second location of the OSD; and
   based on the write to the second location, performing the first information exchange with the OSD, wherein the first information exchange is independent of the agent sending to a host operating system of the computer platform any system call describing the first information exchange.

16. The method of claim 15, wherein the agent is an application running in a user space supported by the host operating system.

17. The method of claim 16, further comprising:
   sending a request to the host operating system, wherein the host operating system registers the agent with the ODS in response to the system call; and receiving an identifier of a memory region of the OSD provided by the host operating system in response to the request, wherein the write to the second location stores the identifier of the memory region.

18. The method of claim 16, wherein the write to the second location stores an identifier of the agent.

19. The method of claim 16, wherein the write to the first location is caused by the write to the second location based on a memory mapping of the first location to the second location.

20. A non-transitory computer-readable storage medium having stored thereon instructions which, when executed by one or more processing units, cause an agent of a computer platform to perform a method comprising:
   performing a write to a first location in a memory space allocated to the agent, the write to the first location to request a first information exchange between the memory space and an object-based storage device (OSD) of the computer platform, wherein the write to the first location causes a write to a second location of the OSD; and
   based on the write to the second location, performing the first information exchange with the OSD, wherein the first information exchange is independent of the agent sending to a host operating system of the computer platform any system call describing the first information exchange.

21. The computer-readable storage medium of claim 20, wherein the agent is an application running in a user space supported by the host operating system.

22. The computer-readable storage medium of claim 21, the method further comprising:
   sending a request to the host operating system, wherein the host operating system registers the agent with the ODS in response to the system call; and
   receiving an identifier of a memory region of the OSD provided by the host operating system in response to the request, wherein the write to the second location stores the identifier of the memory region.

23. The computer-readable storage medium of claim 21, wherein the write to the second location stores an identifier of the agent.

24. The computer-readable storage medium of claim 21, wherein the write to the first location is caused by the write to the second location based on a memory mapping of the first location to the second location.

* * * * *